United States Patent

Kanada et al.

Patent Number: 5,550,560
Date of Patent: Aug. 27, 1996

[54] IMAGE DISPLAYING APPARATUS

[75] Inventors: Yoshihisa Kanada, Tokyo; Kiyokuni Kawachiya, Kawasaki; Ichiro Shiio, Yokohama, all of Japan

[73] Assignee: International Business Machines Corporation, Armonk, N.Y.

[21] Appl. No.: 537,071

[22] Filed: Sep. 29, 1995

Related U.S. Application Data

[63] Continuation of Ser. No. 195,002, Feb. 14, 1994, abandoned.

[30] Foreign Application Priority Data

Feb. 12, 1993 [JP] Japan .................................. 5-023963

[51] Int. Cl.⁶ ............................................ G09G 5/00
[52] U.S. Cl. ........................................ 345/156; 345/158
[58] Field of Search ............................ 345/156–158; 358/450, 453; 359/142, 146, 148; 348/97, 64, 254, 371

[56] References Cited

U.S. PATENT DOCUMENTS 5,045,843 9/1991 Hansen ...................... 359/142 X
5,227,985 7/1993 DeMenthon ................. 345/158 X

FOREIGN PATENT DOCUMENTS 2208515 8/1990 Japan ............................ 345/158

Primary Examiner—Ulysses Weldon
Attorney, Agent, or Firm—Casimer K. Salys

[57] ABSTRACT

A system and method for detecting when an operator selects one of multiple objects from a projected image. Image data, object data and relative position data drive a liquid crystal unit to form on a screen a composite display of both image and objects. When the operator presses a switch, a signal including the state of brightness from an optical sensor is entered into a brightness determinator of a personal computer. The brightness determinator initiates the determination of the brightness and then the object controller varies the brightness of each object. Along with the change in the brightness of objects, the brightness determinator decides the object indicated based on the brightness detected by the optical sensor to cause an object correspondence processor to effect the processing (conversion of a display) corresponding to the object selected by the operator.

10 Claims, 15 Drawing Sheets

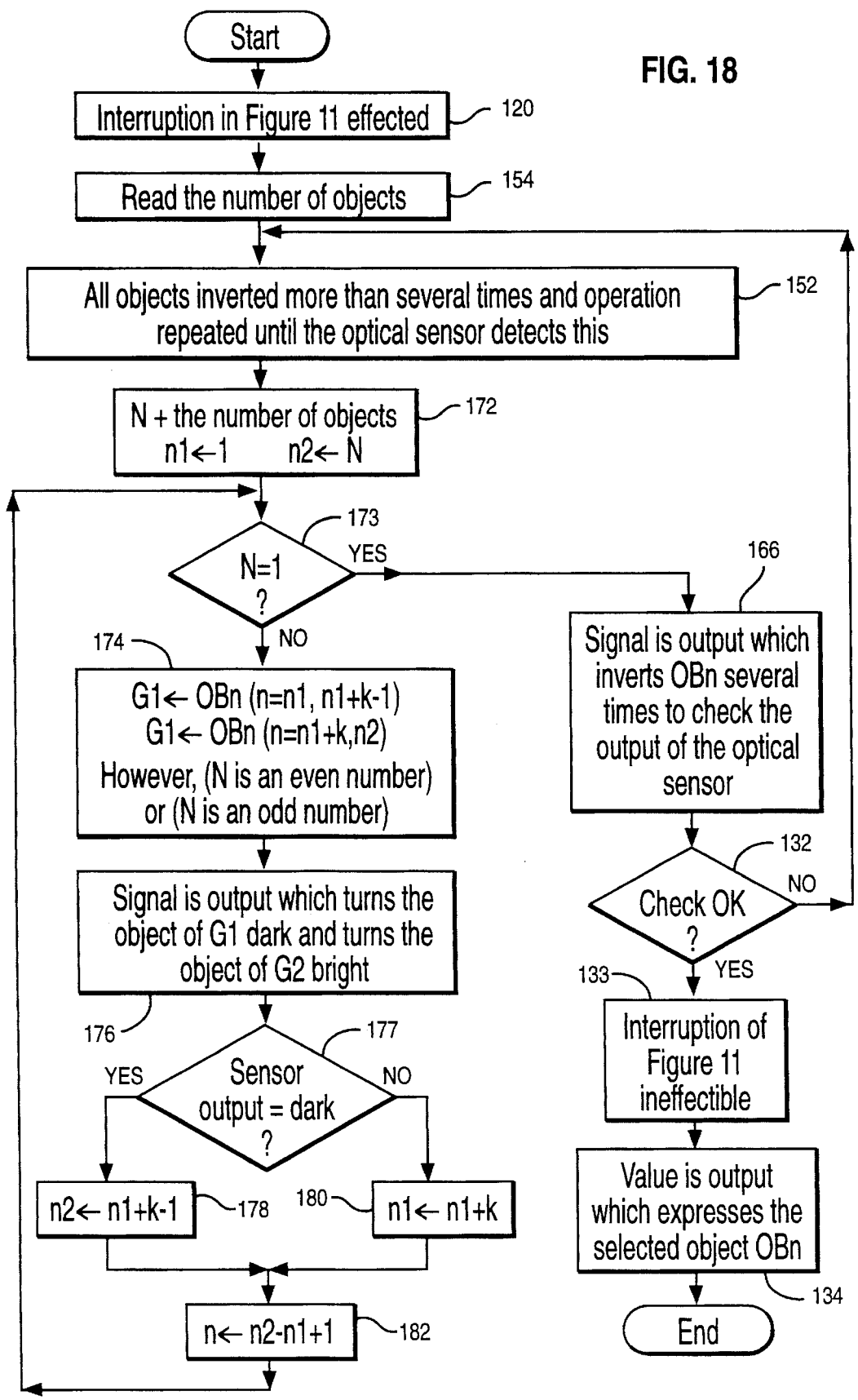

IMAGE DISPLAYING APPARATUS

This is a continuation of application Ser. No. 08/195,002 filed Feb. 14, 1994, now abandoned.

BACKGROUND OF THE INVENTION

1. Field of the Invention

The present invention relates to an image displaying apparatus that allows an operator to control the display of a digital image or the like as produced by a computer or projector on a screen during the showing of the image at a presentation or a lecture.

2. Background and Related Art

At conventional presentations or lectures, characters or figures are projected on a screen with an overhead projector (OHP), or displayed on a display monitor, to give explanations while showing images of such characters or figures.

The prior art includes apparatus for detecting a predetermined position on a screen indicated by an operator to convert an image into a preferred one so that he/she smoothly can give an explanation. This apparatus is equipped with a light-emitting element at the tip of pointer used by the operator when giving an explanation, the element causing the apparatus to emit light with a switching operation to form an indication point on the screen where the OHP generates an image. The image on the screen is photographed by a different camera, and indication point is detected by light emitted from the image as photographed by the television camera to change the image into another image corresponding to the detected indication point.

However, an apparatus that detects the indication point with a television camera requires an alignment of the image projected by the OHP to the position of the image detected by the television camera as mentioned above. This may cause an error in detection of the indication point. In other words, when the operator (presenter) moves the OHP or the television camera to deviate the projection positions of the image and the detection position of the indication point relative to each other, the position for specifying the indication point will be deviated.

In addition, since the brightness of the image that forms a background is not definite in detecting the position of the indication point from the emitted light, the image projected on the screen may vary the output of the television camera with the result that a bright luminous point is detected by mistake as the indication point. This does not allow a complete determination of the indication point thereby causing an error in recognizing the indication point.

As an apparatus for solving the above problem, thus exists an image displaying apparatus that blinks an indication region (hereinafter referred to as an object) for image conversion on an image projected on a screen by control of a calculator to detect the object indicated by the operator, thereby indicating the conversion of the projected image (IBM Technical Disclosure Bulletin, Vol. 33, No. 6B, November 1990). This technique determines which object has been selected by allowing an operator to select the object by blinking on the screen with an indication device and to detect the blinking indication region with a detector mounted on the indication device.

However, as in the above device, constantly blinking the object to analyze the blinking signal may cause an error in the detection of the object as in the case of detecting the indication point with the television camera.

For example, when the operator moves the indication device, the output of the detector varies with an image on the screen and the orientation of a light detector. In addition, when data such as animated images or the like is displayed on a screen in which data is accompanied by a change in brightness, the output signal of the detector varies at any position where the operator places the indication device as well as in the object. Consequently, even when the object is blinked, the object cannot be determined reliably.

The object of the present invention is to provide an image display apparatus that can accurately detect the object designated by the operator in consideration of the above fact.

SUMMARY OF THE INVENTION

In order to attain the above objective, the apparatus in one form comprises an image output means for outputting an image signal expressing an image; a region signal output means for forming an indication region, which is indicated so as to effect a process determined in advance, at a predetermined position within said image, and for outputting regional signal for varying brightness of said indication region; a screen display means for displaying a screen based on said image signal and said region signal; an indicating means equipped with a light-receiving element detecting brightness and with a switch indicating whether the brightness has been detected; a determining means for determining, based on the brightness detected by said light-receiving element, whether said indication region has been indicated by said indicating means, when said switch indicates detection of the brightness; and a determination indication processing means for effecting, when a determination is made that said indication region has been indicated.

The apparatus in another form comprises an image output means for outputting an image signal for expressing an image; a region signal output means for forming an indication region, which is indicated so as to effect a process determined in advance, at a predetermined position within said image, and for outputting regional signal for varying brightness of said indication region; a screen display means for displaying a screen based on said image signal and said region signal; an indicating means equipped with a light-receiving element detecting brightness and with a switch indicating whether the brightness has been detected; a determining means for determining, based on the brightness detected by said light-receiving element and the region signal of said region signal output means, that any one of said indication regions has been indicated by said indication means; and a determination indication processing means for effecting, when a determination is made, the processing corresponding to the determined indication region.

The image displaying apparatus is equipped with an image displaying means for displaying an image based on an image signal and a region signal. The image signal is a signal for expressing an image and is output from the image signal output means. The region signal is a signal for forming an indication region designated for effecting a processing determined in advance and for varying the brightness of the indication region. The region signal is output from the region signal output means. The predetermined processing includes the conversion of the screen when the screen displayed is static, quiescing, quickly traversing, and the rewinding of the screen when the screen is moving. Furthermore, the image displaying apparatus can initiate the driving of the peripheral devices such as sound devices for starting the reproduction of explanation sounds corresponding to the screen displayed and or for starting music and illumination devices that vary the brightness of the environmental illumination.

The operator operates the indication means to indicate on the screen. This indication means is equipped with a light-receiving element for detecting the brightness and a switch with which the operator can indicate whether or not the brightness of the above indication region can be detected. Consequently, when the indication means indicates the brightness, the determining means determines that the indication region is indicated based on the brightness detected by the light-receiving element. There are animation images in which bright and dark sections are mixed, or images whose brightness varies dramatically, and should not determined as an indication regions by mistake. When the determining means determines that the indication region is indicated, the determination indication processing means effects the processing corresponding to the determined indication region. This allows effecting with certainty the processing corresponding to the indication region indicated by the operator.

Furthermore, when a plurality of indication regions are formed in the displayed image, processing becomes complicated to determine which indication region is indicated by the operator. Therefore the apparatus of the present invention according to one practice forms at a predetermined position in the image a plurality of indication regions indicated for effecting the processing determined in advance, and outputs a region signal for varying the brightness for each group by classifying the plurality of indication regions into one that brightens and one that darkens the indication regions. Consequently, the screen displays an image and a plurality of indication regions.

The plurality of indication regions are largely classified into regions that brighten and regions that darken. The determining means determines that one of the indication regions has been indicated based on the brightness detected by the light-receiving element and the region signal output indicates that the brightness has been detected. In other words, all the indication regions are classified into two groups, ones that brighten and ones that darken so as to determine which group the indication region, to which the light-receiving element is directed, belongs to. Furthermore the indication regions in a group which include the above indication region are classified into two, those that brighten and those that darken, to determine the region to which the light-receiving element is directed by repeating the same operation mentioned above. The determination indication processing means effects the processing corresponding to the indication region that has been determined so as to reliably effect a processing corresponding to the indication region indicated by the operator. Thus roughly classifying the plurality of indication regions into an indication region that brightens and an indication region that darkens eliminates the need for consecutively determining from a plurality of indication regions and allows the restricting of indication regions from a plurality of indication regions, thereby making it possible to determine the indication region indicated by the operator in a short time.

BRIEF DESCRIPTION OF THE DRAWINGS

FIG. 18 is a flowchart showing the details of N object determination subroutines.

DESCRIPTION OF THE PREFERRED EMBODIMENT

The present invention will be detailed hereinbelow. In the first embodiment, the present invention is applied to an image displaying apparatus used in performances and presentations.

Figure 1:
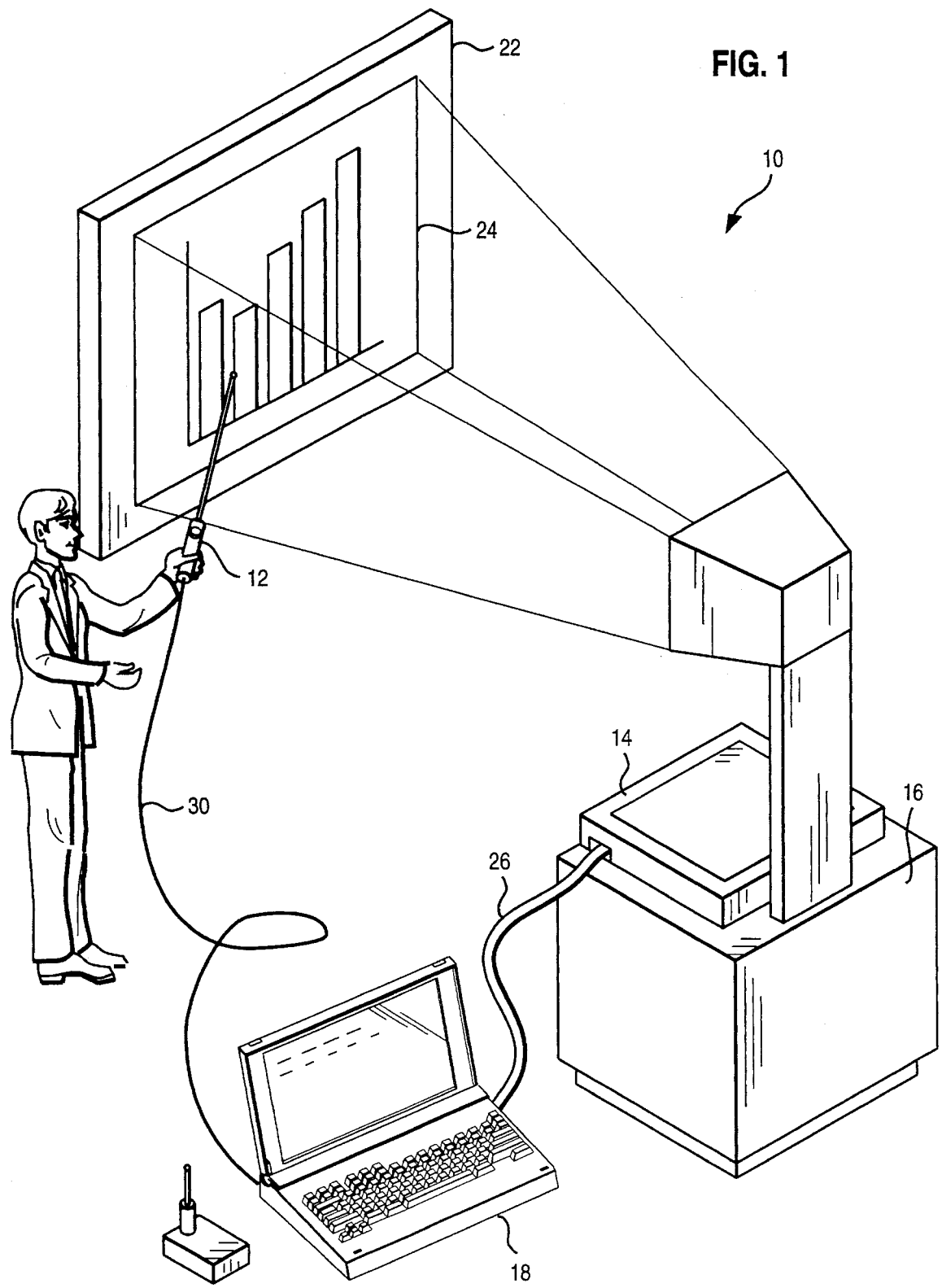
FIG. 1 is an external view showing the construction of embodient 1 of an image displaying apparatus of the present invention.
Figure 3:
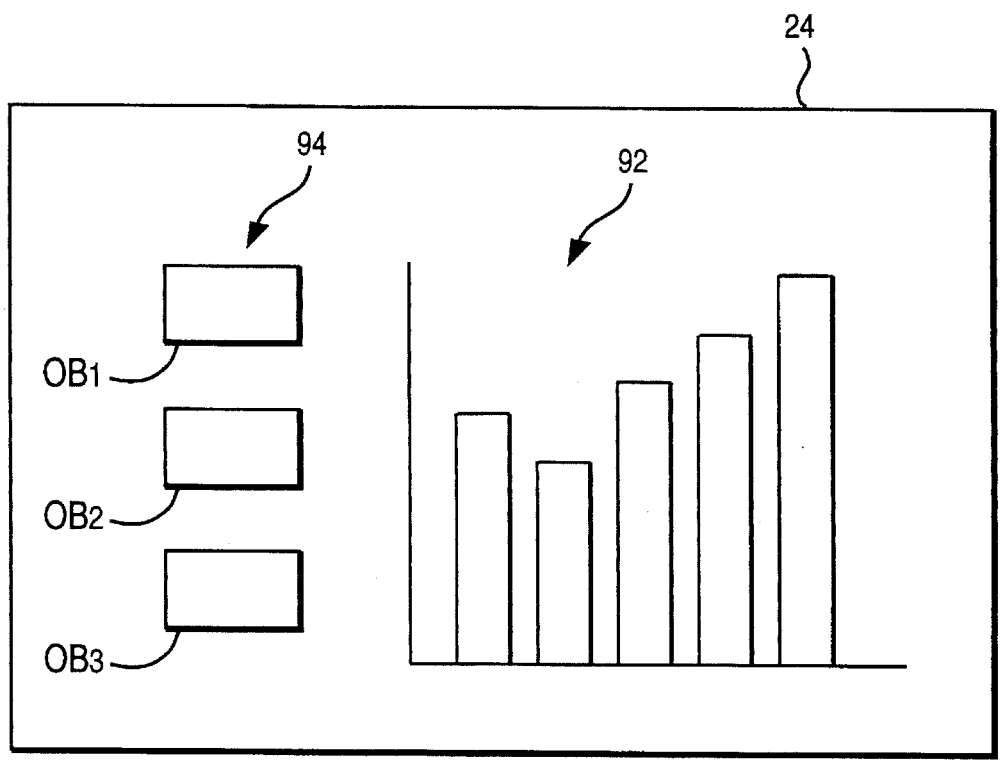
FIG. 3 is an image view showing a display projected on a screen.

As embodied in FIG. 1, an image displaying apparatus 10 uses an overhead projector (hereinafter referred to as OHP) 16 for projecting an image 24 on a screen 22. This OHP 16 is equipped with a liquid crystal unit 14. The liquid crystal unit 14 forms a position corresponding to an input signal and a portion exhibiting an opaque transmittance rate so as to restrict and allow light from the light source (not shown) in the drawings on the lower body of the OHP 16 to pass through the portion. This liquid crystal unit 14 is connected to a personal computer (hereinafter referred to as PC) via a cable 26. The PC 18 controls the position of, and the transmittance rate of, the opaque portion of the liquid crystal unit 14. Consequently, when the transmittance rate is set to approximately 0%, a binary image is formed on the liquid crystal unit 14 and an image formed on the liquid crystal unit 14 controlled by the PC 18 is projected to form a display 24 (see FIG. 3). In addition, a continuous gray scale image can be projected by this transmittance rate which corresponds to the gray scale level of the image. Moreover, PC 18 can store data and a program for controlling the display 24 (detailed description will be given later).

The operator uses an indicator 12 (see FIG. 2) equipped with an indication switch 36, for giving indication of conversion of the display 24, to identify parts of the display 24 while giving an explanation. The indicator 12 is connected to the PC 18 via a connection cable 30.

Figure 2:
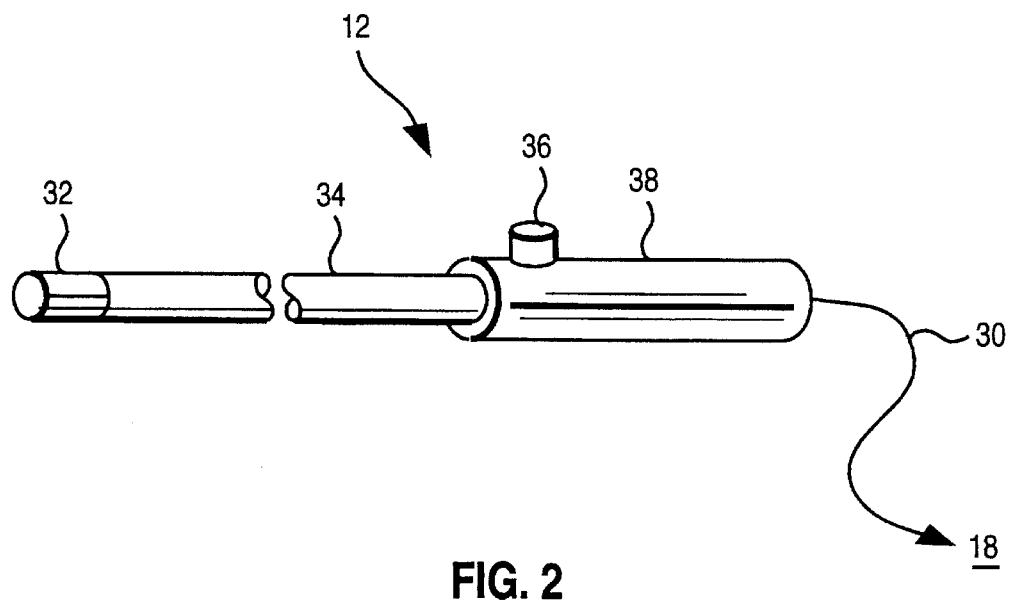
FIG. 2 is an external perspective view of an indicator using embodient 1 of the image displaying apparatus.

As shown in FIG. 2, the indicator 12 is equipped with a grip barrel 38 held by the operator. An indication switch 36 is mounted on the grip barrel 38. This grip barrel 38 is equipped with an optical sensor 32 mounted on a rod 34. Furthermore, inside the grip barrel is housed an output circuit (see FIG. 4) 41 for coding light received by the optical sensor 32 and an on-off signal of the indication switch 36 to output the light and the signal.

Figure 4:
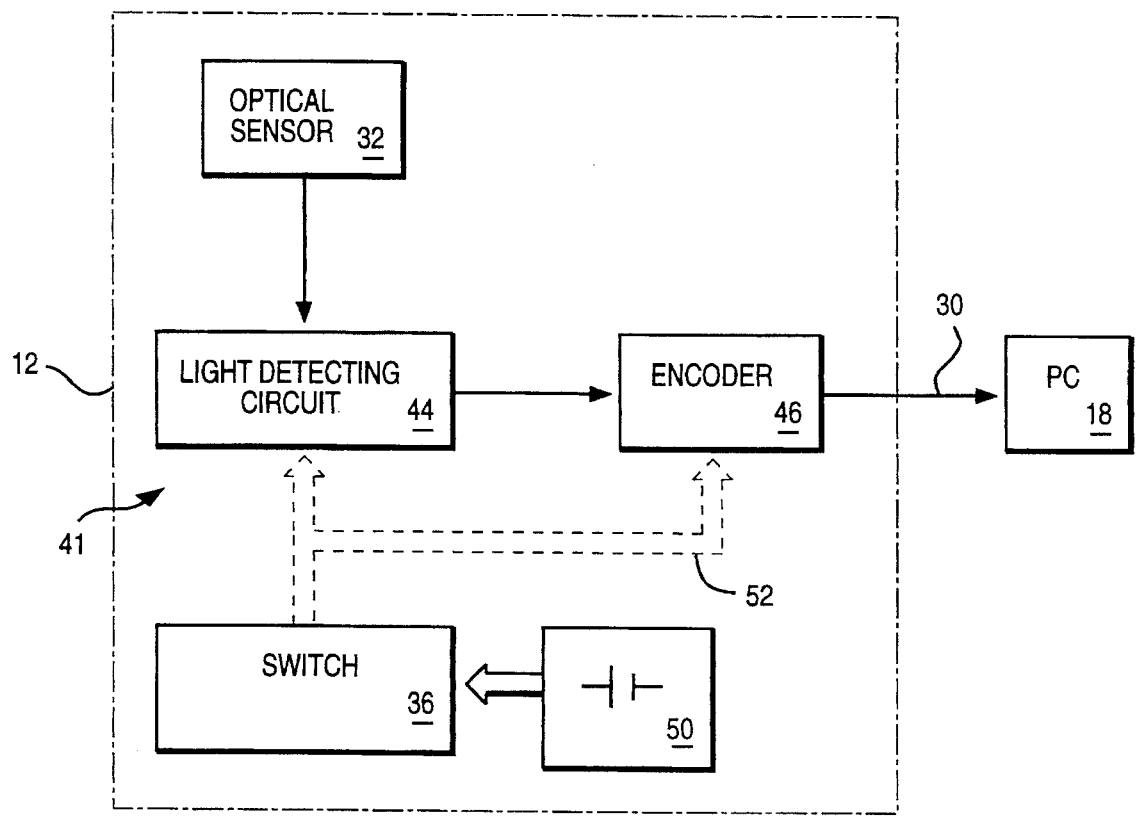
FIG. 4 is a block view showing a general construction of an indicator in embodient 1 of the image displaying apparatus.

As shown in FIG. 4, the output circuit 41 of the indicator 12 comprises a light detecting circuit 44, an encoder 46 and a battery 50 such as a dry cell or the like. The optical sensor 32 is connected to the light detecting circuit 44 of the output circuit 41 so that a sensor output signal corresponding to the quantity of received light output from the optical sensor 32 is entered into the light detecting circuit 44. This light detecting circuit 44 is a circuit (see FIG. 5) for outputting either a high level or a low level signal corresponding to the brightness (either "bright" or "dark" mentioned later) of light detected by the optical sensor 32 depending on the level of the signal entered from the optical sensor 32.

The output side of this light detecting circuit 44 is connected to the PC 18 via an encoder 46. The encoder 46 is a circuit for converting the entered signal into a bit queue to output it. The circuit output to the PC 18 is a bit queue signal converted into a two-bit signal comprising one bit signal expressing the brightness (either bright or dark) detected by the optical sensor 32 and one bit signal of on-off state of the indication switch 36.

Electric power is supplied by the electric power line 52 to the above light detecting circuit 44 and the encoder 46. In other words, this electric power line is connected to a battery 50 via an indication switch 36. When the indication switch 36 is pressed, the electric power of the battery 50 is supplied to the light detecting circuit 44 and the encoder 46 via the electric power line 52.

Figure 5:
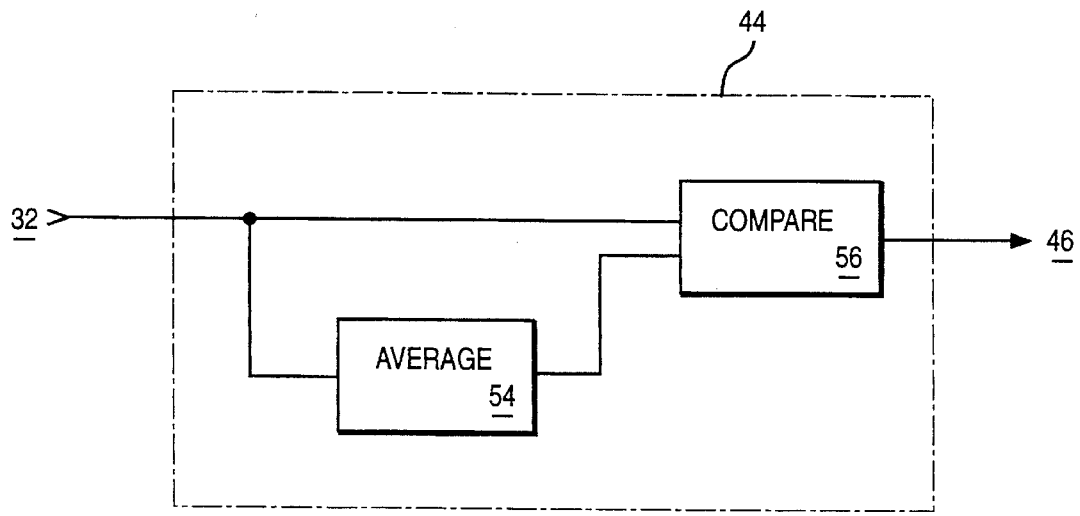
FIG. 5 is a block view showing the construction of the light detecting circuit of FIG. 4.

As shown in FIG. 5, the light detecting circuit 44 comprises an averaging circuit 54, and a comparison circuit 56. The above circuits are connected so that an output signal from the optical sensor 32 is entered both to the input side of the averaging circuit 54 and the first input side of the comparison circuit 56. In addition, the output side of the averaging circuit 54 is connected to the second input side of the comparison circuit 56. The output side of the comparison circuit 56 is connected to the encoder 46. The averaging circuit 54 is a circuit for outputting a signal having a level averaged in a predetermined time by removing noise from the input signal whereas the comparison circuit 56 outputs a signal obtained as a result of the comparison between the level of the output signal of the optical sensor 32 and the signal level averaged by the averaging circuit 54.

One embodiment of the comparison circuit 56 compares the signal level on the first input side with the signal level on the second input side serving as a reference. When the signal level on the first input side exceeds the signal level on the second input side, a high level signal is output. When the signal level on the first input side is lower than the signal level on the second input side, a low level signal is output.

Figure 7:
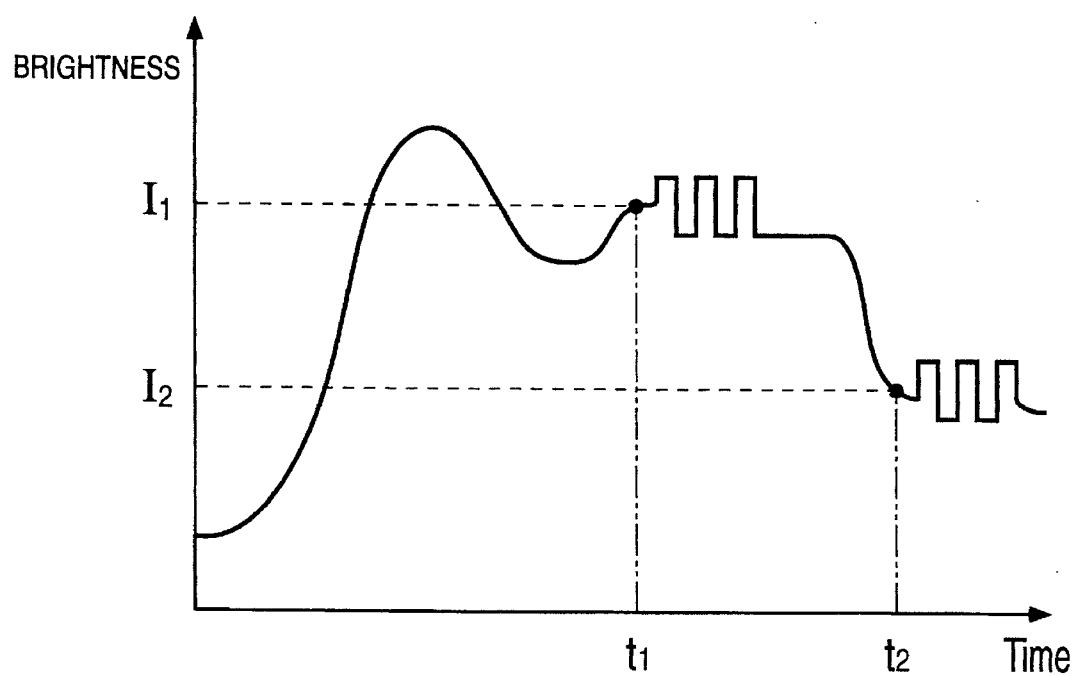
FIG. 7 is a line view showing the state in which the brightness illuminated by the optical sensor of the indicator varies along with time.

For this embodiment, the brightness of the indication region (hereinafter referred to as an object) for such operation as screen conversion or the like mentioned hereinbelow is detected by inverting the quantity of light, when the indication switch 36 is pressed, into a "bright" state given by brightening the original state by a predetermined quantity of light or into a "dark" state given by darkening the same state by a predetermined quantity of light. In other words, as shown in FIG. 7, the quantity of light detected by the optical sensor 32 varies depending on the brightness corresponding to portions of each image on the display 24 in the process in which an operator explains while indicating the point of his explanation with the indicator 12. Under these circumstances, when the operator presses the indication switch 36 at a certain time $t_1$, the signal on a level corresponding to an average quantity of light $I_1$ in the period when the switch is pressed is output to the comparison circuit 56. Later varying this quantity of light $I_1$ by a predetermined quantity of light to invert the quantity of light into a "bright" state or a "dark" state to drive the circuit causes the comparison circuit 56 to compare the quantity of light $I_1$ and the detected quantity of light to output a high level or a low level signal. Subsequently pressing the indication switch 36 at a time $t_2$ elapsed from the time $t_1$ causes a signal at a level corresponding to the average quantity of light $I_2$ in the period when the switch is pressed to be output to the comparison signal 56, thereby comparing the quantity of light $I_2$ and the detected quantity of light, and outputting a high level or a low level signal.

Consequently, the signal output from the comparison circuit 56 uses as a reference value a signal at a level corresponding to the average quantity of light in a period when the indication switch 36 is pressed, the signal being output from the averaging circuit 54. When the output signal of the optical sensor 32 exceeds the reference value, a bright state is generated so as to provide a high level signal. When the output signal is lower than the reference value, a dark state is generated so as to provide a low level signal.

Figure 6:
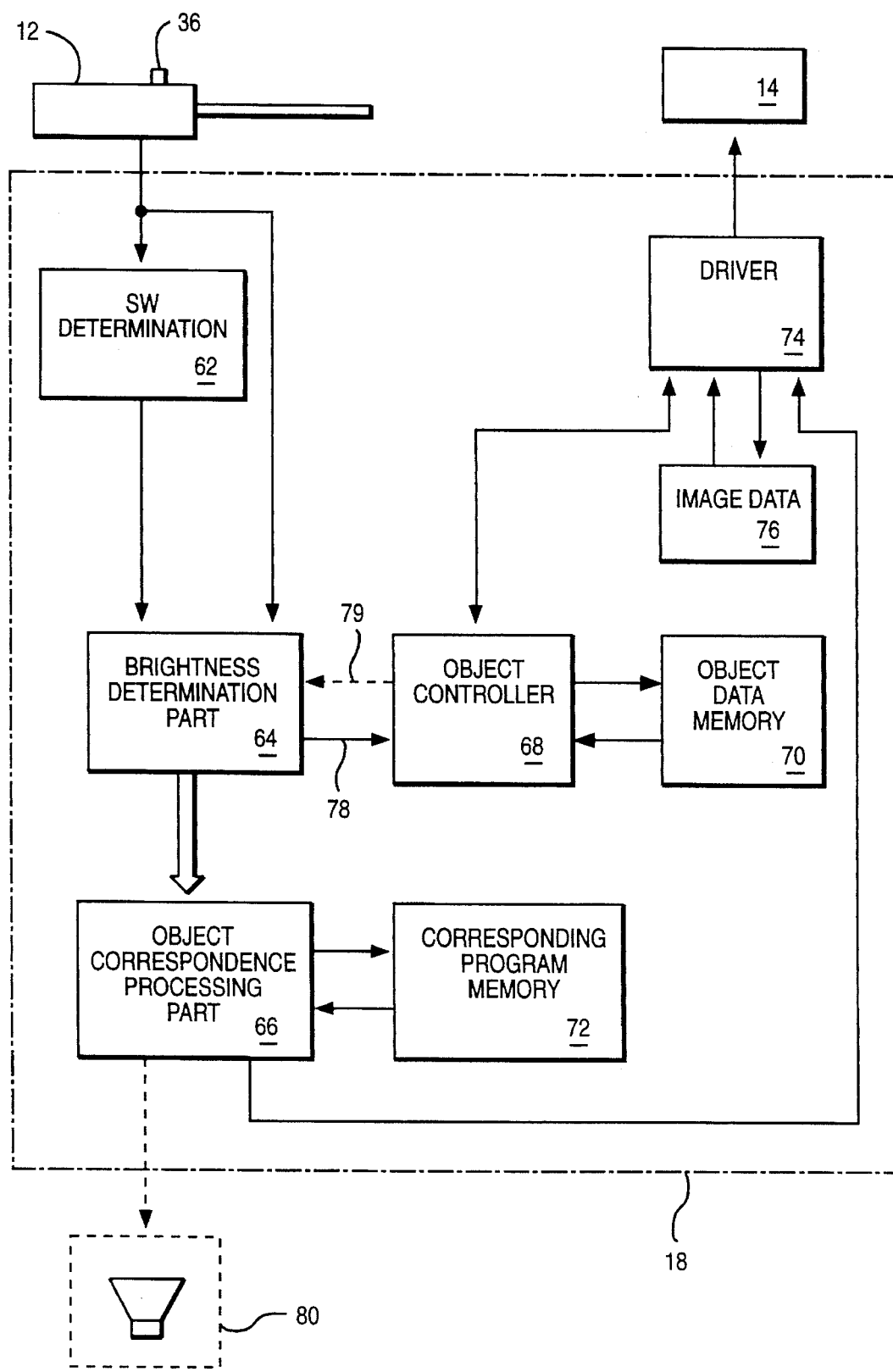
FIG. 6 is an block view showing the general construction by function of a personal computer used in embodient 1 of an image displaying apparatus.

FIG. 6 is a block view showing by the function of the PC 18 the flow of a signal for displaying on a screen 22 a display 24. At the outset, image data stored in an image data memory 76 is entered into a driver 74. A signal output from the driver 74 drives a liquid crystal unit 14, and an image is projected on a screen 22 (see FIG. 1). At this time, the number of objects relative to this projected image (main image 92) and their positional data is entered into the driver 74. Consequently the main image 92 and an object image 94 are projected on the screen 22 to a display 24 (see FIG. 3). The number of objects and the position data are stored in an object data memory 70 so that an object controller 68 outputs object data from the object data memory 70 to the driver 74. Incidentally an SW determining part 62 and the object controller 68 may be connected to project the object image 94 with an indication of the operator through the use of the on/off signal of the indication switch 36.

The operator gives an explanation by using the display 24 projected on the screen 22, and presses the indication switch 36 when it is required to convert the display. This allows a signal including the brightness of the object to be output from the indicator 12. The output signal of the indicator 12 is entered into the switch determining part of the PC 18. The switch determining part 62 determines whether or not the indication switch 36 is on. When the indication switch 36 is on, the on signal is output to the brightness determining part 64. This allows a Signal expressing the brightness of the object to be output to the brightness determining part 64 via the switch determining part 62. This allows the brightness determining part 64 to output a signal to the object controller 68 via a signal line 78. The object controller 68 outputs the signal to the driver 74 so as to vary the brightness of each object either into the bright state or the dark state depending on the position and number of the objects. Moreover, the signal line 79 is a line for sending out data concerning the number of objects to the brightness determining part 64 from the object control part 68.

The brightness determining part 64 determines the object indicated by the operator based on the brightness detected by the on signal of the indication switch 36 and the optical sensor 32. Then the brightness determining part 64 outputs a value expressing the determined object to the corresponding object 66.

A stored processing program corresponding to each object from the object program memory 72 is entered into the object correspondence processing part 66. Consequently the object correspondence processing part 66 effects a processing depending on a program corresponding to the entered object. The corresponding process in the first embodiment outputs a cut-off signal to a driver 74 for converting the display. The driver 74 reads predetermined data, for example, from the image at a memory 76 based on this cut-off signal. Moreover, the processing program corresponding to this object can connect an acoustic device 80 to the object correspondence processing part 66 to drive this acoustic device 80. This enables control of the sound of music and tapes depending on the display.

Figure 8:
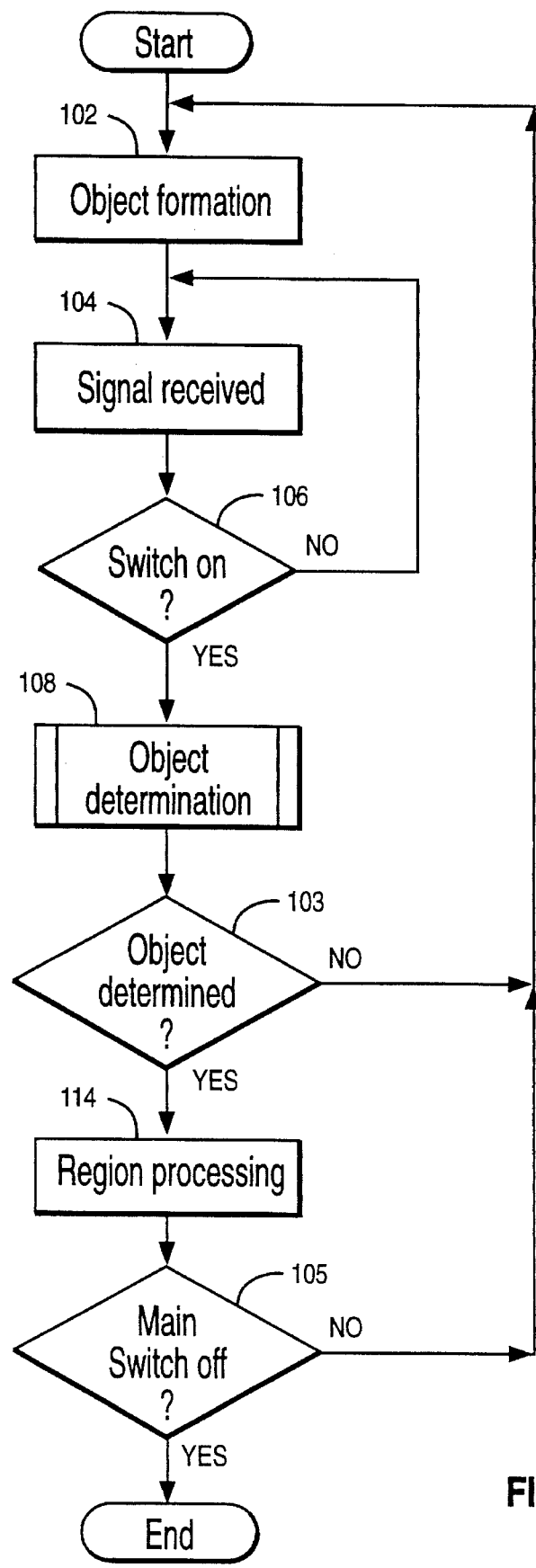
FIG. 8 is a flowchart showing a control main routine in embodient 1.

The operation of the first embodiment will be detailed hereinbelow along with the operation of the PC 18. At the outset, when an image is displayed on the screen 22, the control main routine shown in FIG. 8 is effected. At the outset, at step 102, the execution of the object control part 68 is initiated (see FIG. 10). A plurality of objects corresponding to the projected image is determined so as to display an object image 94 (see FIG. 3). Subsequently, when the operator turns on the indication switch 36, an on signal is output from the switch determining part 62 to the brightness determining part 64 (step 104 and step 106), and object processing is initiated at step 108. Thus persons who look at the display feel no irritation due to the varying of the brightness of the object.

Step 108 is a subroutine (details are given hereinafter) for determining which object is indicated by the operator in the processing of the brightness determining part 64 and the object control part 68. At this step the object indicated by the operator is determined. A value corresponding to the determined object is output from the brightness determining part 64 to the object correspondence processing part 66.

At step 103 it is determined whether or not the object can be determined by determining whether or not the switch 36 has been turned off (interrupted) in the processing of the object determination at step 108. When the object cannot be determined, the process returns to step 102. When the object cannot be determined, the process proceeds to step 114.

Consequently at step 114, the region processing corresponding to the object determined by the brightness determination part 64 is effected in the processing of the object correspondence processing part 66. In this particular embodiment, an indication is given to convert the display to the driver 74. In this region processing, apart from the display conversion, an animated image may be quiesced, or a frame of animation may be fed. Music can be either started or stopped. The quantity of illumination may be changed. Peripheral devices may be driven such as opening and closing a curtain. When the region processing is terminated, infinite loop processing is effected (step 105) until the main switch (not shown in the drawings) of the system is turned off.

Figure 9:
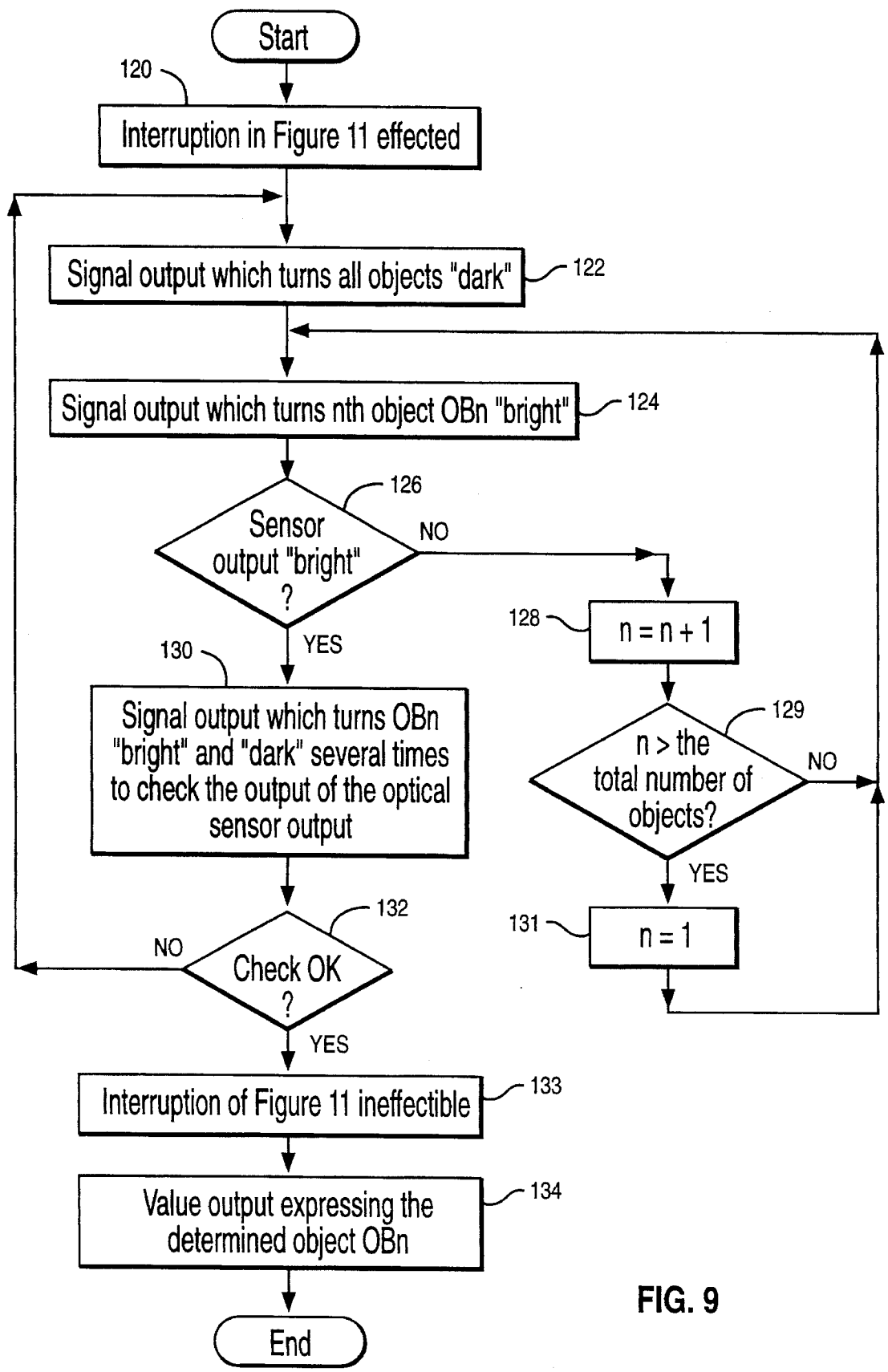
FIG. 9 is a flowchart showing the details of the control in the brightness determination part with respect to embodient 1 of an object determination subroutine.

Then the details of the above step 108 will be explained. The brightness determination in embodiment 1 is effected with the successive blinking method in which an indicated object is determined by successively brightening the object. The subroutine for determining the indicated object, as shown in FIG. 9, is effected at the brightness determination part 64. At step 120, the interruption routine mentioned hereinbelow (see FIG. 11) can be effected. This is a process for interrupting a brightness determination when the operator has shifted the indication switch 36 from on to off in order to interrupt the object selection. When the process proceeds to step 122, a signal is output to the object control 68 so that the brightness of the object $OB_1$, $OB_2$, and $OB_3$ projected on the screen 22 becomes dark (see FIG. 13). In addition, a value n expressing the object is set to 1.

Subsequently at the step 124, an indication signal expressing an object for brightening the object $OB_n$ (n=1, 2, 3) so that the object successively becomes "bright" is output to the object controller 68. In this case, a signal expressing the object $OB_1$ is output to the object controller 68. This brighten the brightness of the object $OB_1$ into the "bright" state. Subsequently at step 126 it is determined whether or not the output of the optical sensor 32 of the indicator 12 is "bright." When it is "bright," an affirmative determination is made. The object is determined to be the object $OB_n$ indicated by the operator. The process proceeds to step 130. On the other hand, when a negative determination is made, the process proceeds to step 129 by incrementing the value n by 1 for determining the next object. At step 129, it is determined whether or not the value n has exceeded the total object number. At the affirmative determination, n is set to 1 (step 131). At the negative determination, the process returns to step 124. In this way, the brightness of the object $OB_n$ (n=1, 2, 3) is successively brightened into the "bright" state so that the output of the optical sensor 32 determines the object in the "bright" state.

Figure 13:
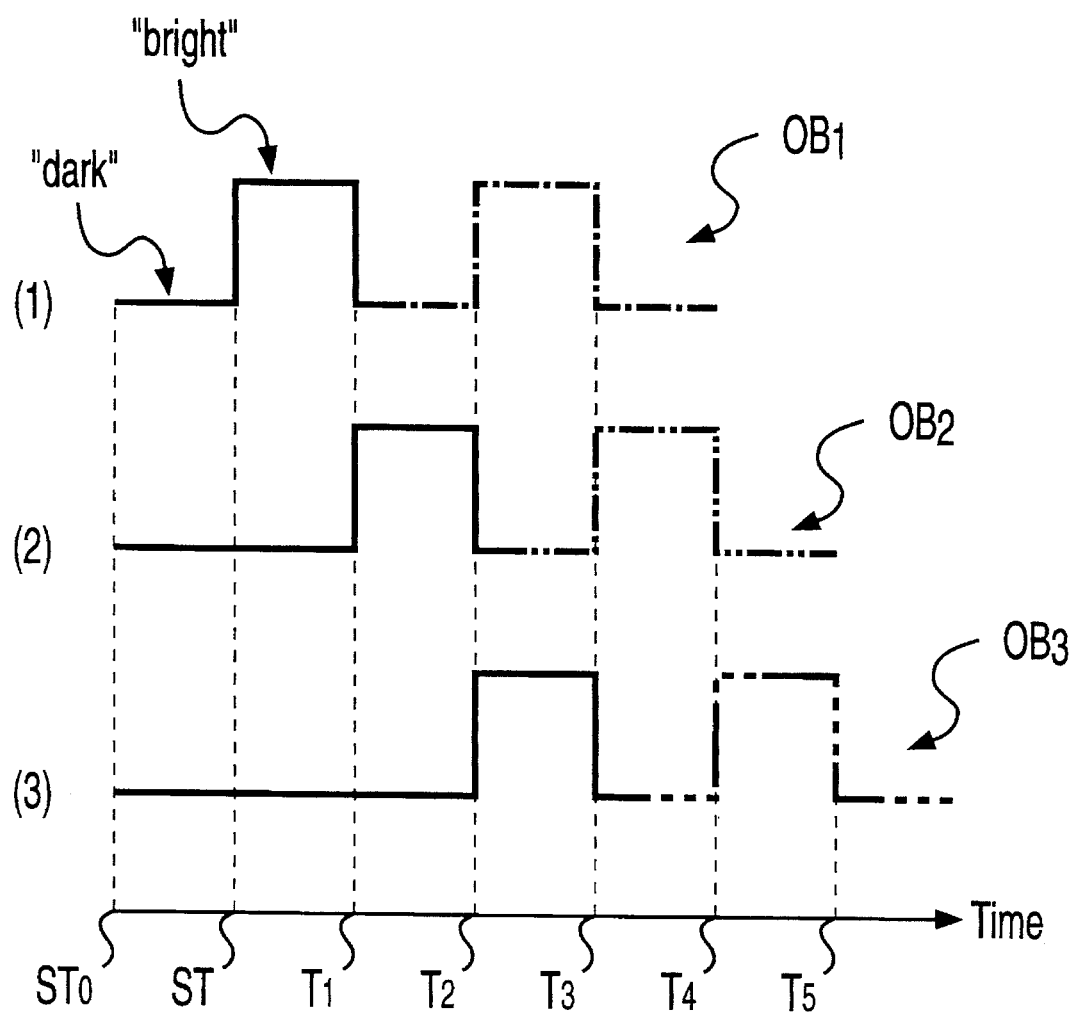
FIG. 13 is a time chart for illustrating an object indicated by successively varying the brightness of the object is determined.

In a detailed description, as shown in FIG. 13 (1), at the outset the brightness of the object $OB_1$ is set to the "bright" state for a predetermined time (time up to time ST) after it is set to "dark" at step 122. When the brightness output from the indicator 12 is determined to be "bright," the operator determines that the object $OB_1$ is indicated to effect the checking operation (mentioned later) of the object $OB_n$ determined at the subsequent step 130. On the other hand, when it is not determined to be "bright," the operator determines that the object $OB_1$ is not indicated. At the same time, the object $OB_1$ is set to "dark," and as shown in FIG. 13 (2), the brightness of the next object $OB_2$ is set to "bright" for a predetermined time (time from time $T_1$ to time $T_2$). Subsequently, as in the case of the above object $OB_1$, when it is determined to be "bright," the object $OB_2$ is subject to check processing. In addition, when the brightness of the object $OB_2$ is not "bright," the object $OB_2$ is set to "dark," and as shown in FIG. 13 (3), the brightness of the next object $OB_2$ is set to "bright" for a predetermined time (time from time $T_2$ to time $T_3$). Subsequently, as in the above example, the object $OB_3$ is subjected to check processing. Thus the brightness of the object is successively determined to decide the object $OB_n$ indicated by the indicator 12.

At the next step 130, a signal is output to the object controller 68 so that the inversion of the brightness of the object $OB_n$ is repeated, thereby confirming that the decided object $OB_n$ is an object indicated by the operator. For example, when a certain object is determined to be the object $OB_1$, the object controller 68 inverts the brightness of the object $OB_1$ in the order of "dark," "bright" and "dark" (see one dot chain line of FIG. 13 (1).) Consequently when the output of the optical sensor 32 is given in synchronization with the "bright" and "dark" of the object, it is possible to determine that the above decided object $OB_1$ is indicated by the operator. In addition, the same holds true when it is determined to be object $OB_2$ (see two dot chain line in FIG. 13 (2) and when they are determined to be objects $OB_2$ and $OB_3$ (see three dot chain line of FIG. 13 (3)).

Incidentally the check processing enables the removal of this varied state even when light and noise changes by effecting inversion movement a plurality of times, thereby making it possible to-effect stable processing.

At the subsequent step 132, it is determined whether or not the brightness detected in the above check processing meets with the brightness at the time of the check processing. In the negative processing, it is determined to be an error in determination resulting from the detection of noise. The process then returns to step 122 to effect the above processing again. On the other hand, in the affirmative determination, the interruption (mentioned later) is set to be ineffectible at step 133. A value expressing the object $OB_n$ determined at step 134 is output to the object correspondence processing 66 in order to terminate the routine.

Incidentally an object indicated by the operator may be determined by successively inverting the object within a predetermined time so that the brightness is set to be "bright" at a different time by the object and by measuring time until the signal output from the indicator 12 becomes bright.

Subsequently the processing at the object controller 68 will be explained by way of FIG. 10. The processing of the object controller 68 comprises two subroutines (FIG. 10 (1) and (2)). Each subroutine is called at a main control routine (FIG. 8) and an object determination routine (FIG. 9).

Figure 10:
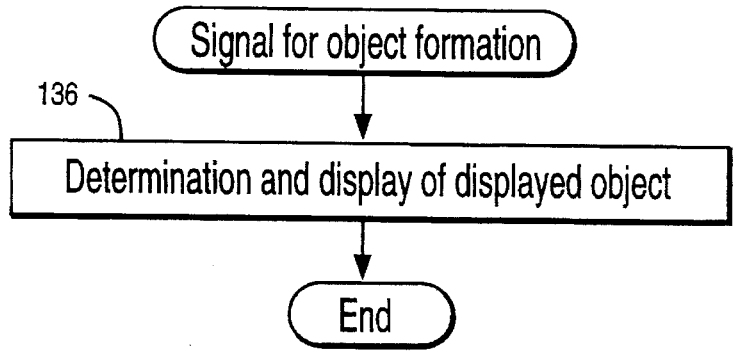
FIG. 10 is a flowchart showing the details of the control in the object controller with respect to embodient 1 of an object determination subroutine.
Figure 10:
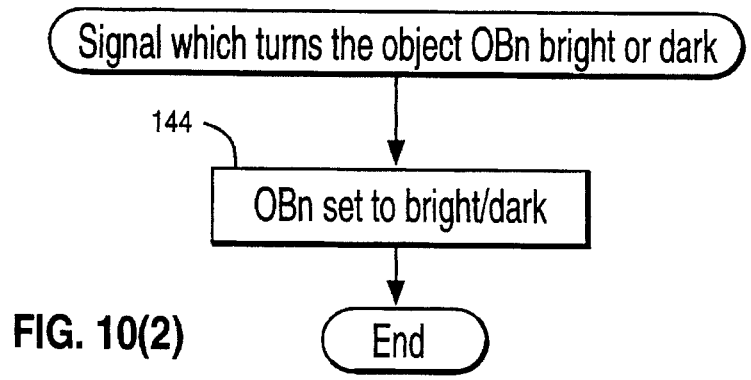

The subroutine designated in FIG. 10 (1) is actuated by receiving a signal for object formation generated in the main control routine (FIG. 8) to proceed to step 136. A plurality of objects corresponding to an image displayed at this step 136 are determined, and a signal is output to the driver 74 so that this determined object image 94 (see FIG. 3) is displayed so as to complete the subroutine.

The subroutine designated in FIG. 10 (2) is actuated with by receiving a signal that turns either "bright" or "dark" nth object $OB_n$ generated at the indication object determination subroutine (FIG. 9) to proceed to step 144. At step 144 the subroutine is completed by turning the object either "bright" or "dark" in accordance with the nth object.

Figure 11:
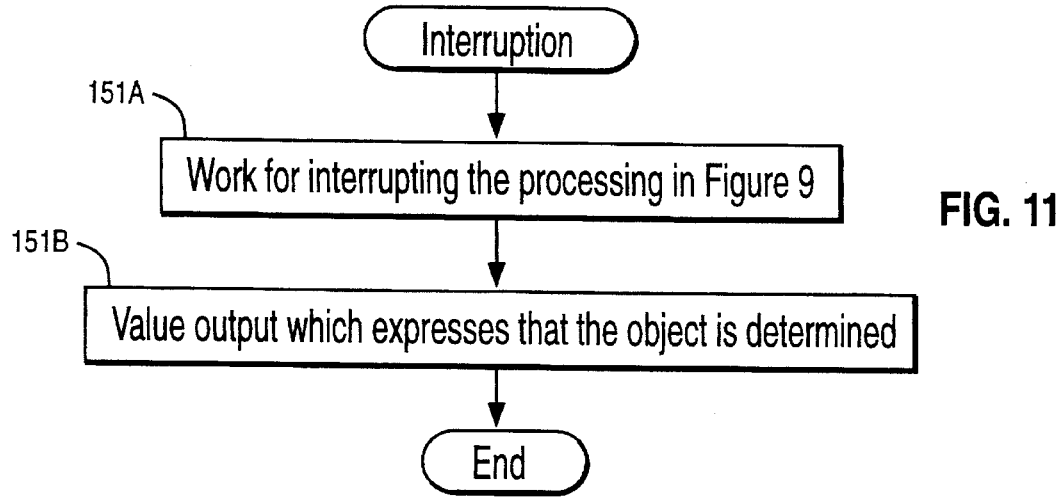
FIG. 11 is a flowchart showing an interruption routine with respect to the object determination subroutine in embodient 1.

Here in this embodient 1, when it is determined that the indication switch 36 is on, the brightness determination processing is effected. At the same time, the interruption routine shown in FIG. 11 is set to be effectible at step 120 of FIG. 9. This interruption routine is effected when the indication switch 36 is shifted from on to off. Since this interruption is effected when the depression of the indication switch 36 is canceled, the brightness determination processing of the object need not to be continued. Consequently, when the depression of the indication switch 36 by the operator is canceled even in the determination processing of the above object, the processing shown in FIG. 9 is immediately interrupted (step 151A), the brightness determination part 64 outputs a value expressing that neither of the objects has been selected to the object corresponding processing part 66 in the place of the processing of FIG. 9 (step 151B). In FIG. 8, since no region processing is effected upon receipt of this value (step 103) the process proceeds to step 102. As a result, the object controller 68 effects the recover processing of the display. Consequently, even when the operator presses the indication switch 36 by mistake, the processing is not continued.

Thus in embodiment 1, depression of the indication switch 36 on the indicator 12 initiates the inversion of the brightness of the object (bright and dark), the timing for the conversion of the display indicated by the operator can be easily synchronized. In addition, since the brightness is inverted only at the time of depressing the indication switch 36, the operator is free from the trouble of watching the display in which the object is blinking.

In addition, since a signal from the indicator 12 is entered into the PC 18 through a connection cable 30 in the first embodiment, a signal with only a small quantity of noise can be entered with a simple construction. The timing for converting the display indicated by the operator can be easily synchronized with a simple construction for detecting the on/off state of the indication switch 36.

A second embodiment of the present invention determines objects while roughly classifying the two kinds. Incidentally, the second embodiment has the same structure as the first embodiment. Therefore, the same parts are identified by the same symbols. Different parts will be explained hereinbelow.

Figure 12:
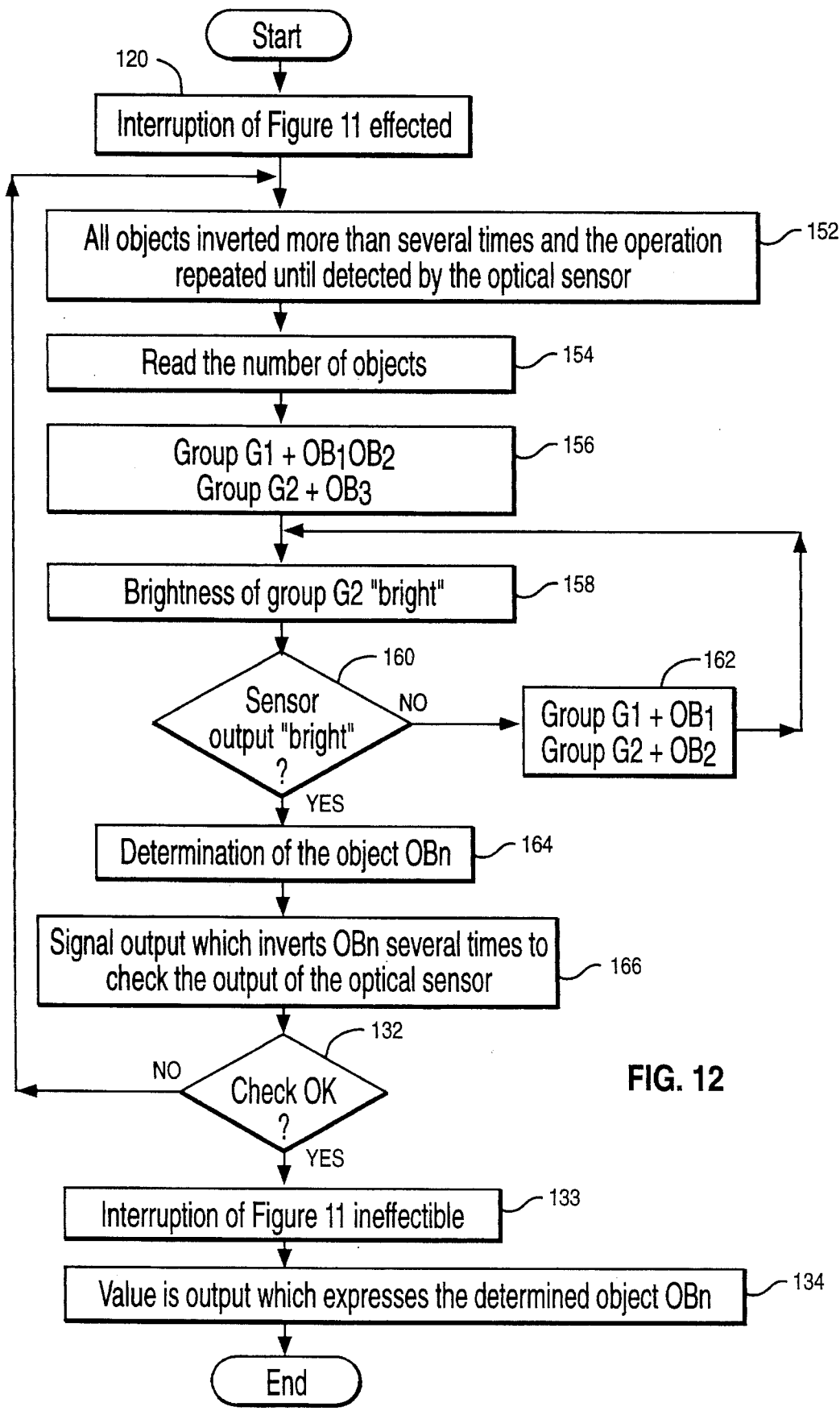
FIG. 12 is a flowchart showing the details of the object determination in embodient 2.
Figure 14:
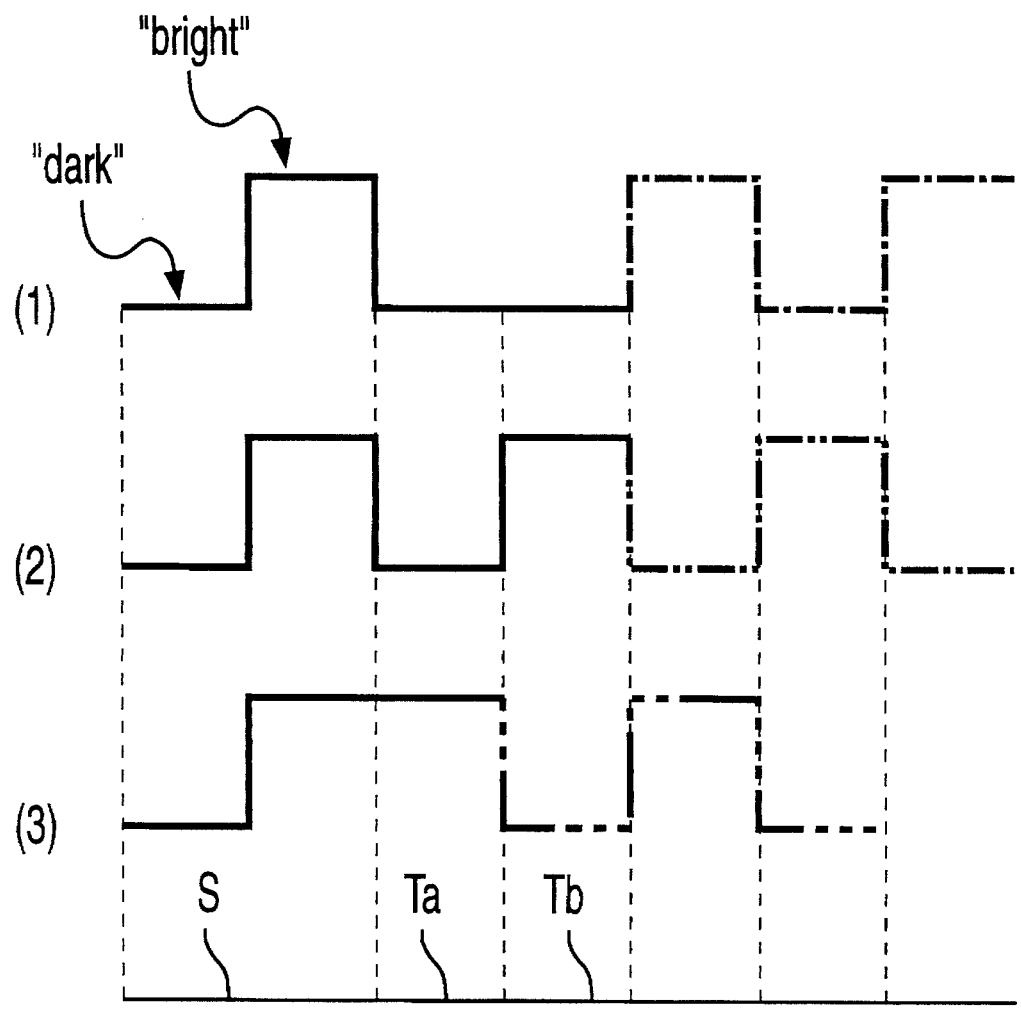
FIG. 14 is a time chart for illustrating an object indicated by varying the brightness of the object by dichotomy.

The second embodiment of the indicated object determination subroutine will be explained by way of FIGS. 12 and 14, the subroutine corresponding to step 108 of FIG. 8. When the routine is effected, the process proceeds to step 120 to make the interruption routine (FIG. 11) effectible. This is a processing for interrupting the brightness determination processing when the operator switches the indication switch 36 from on to off in order to interrupt the object selection. At step 152, a signal is output to the object controller 68 in order to invert the brightness of all the objects (objects $OB_1$, $OB_2$ and $OB_3$) "bright" and "dark" several times. This results in the repetition of the inversion until the optical sensor detects the brightness correctly. This plurality of times of inversion movement is effected so as to determine the operator position of the optical sensor 32 of the indicator 12 on the object image and to provide a stable movement by removing the variant state when the brightness has varied due to optical noise.

At step 154 the number of objects to be displayed from the object controller 68 is read. Then at step 156 objects $OB_1$, $OB_2$, and $OB_3$ are roughly classified into group G1 comprising objects $OB_1$ and $OB_2$ and group G2 comprising an object $OB_3$. At step 158, a signal is output to the object controller 68 which turns the rightness of the object included in group G1 "dark" and the brightness of the object included in group G2 "bright." At the subsequent step 160 the output signal of the optical sensor 32 determines whether or not the object indicated by the operator is included in group G2. In the case of an affirmative determination,the indicated object is included in group G2. In such a case, the object is object $OB_3$, there is no need of further determination of the object. Consequently at step 164, it is determined that the operator indicates the object $OB_3$. The subsequent step 166 effects the check processing like the one at the above step 130. Since the brightness of the object $OB_3$ is bright, a signal is output to the object controller 68 so that the brightness is successively inverted "dark," "bright" and "dark," for example, three times as shown by three dot chain lines in FIG. 14 (3).

At this time, the brightness of the object $OB_3$ is detected with the result that an affirmative determination is made at step 132 when the brightness corresponds to the inversion. At the subsequent step 133 the interruption is made ineffectible. At the subsequent step 134 is output the fact that the object indicated by the operator is the object $OB_3$, thereby terminating the routine.

On the other hand, when a negative determination is made at step 160, what is indicated by the operator is either the object $OB_1$ or $OB_2$, the object $OB_1$ is set to group G1 at step 162 whereas the object $OB_2$ is set to group G2, thus returning to step 158. At step 158, a signal that turns group G2 comprising bright objects "bright" is output to the object controller 68 so that the brightness is determined in each group in the same manner as mentioned above (see FIG. 14, corresponding to the brightness of each object at time Tb). Here, at the subsequent step 160, a determination is made as to whether the object indicated by the operator is included in group G2. Even when a negative determination is made, and objects cannot be roughly classified into large groups, the process proceeds to step 164 to decide the object indicated by the operator from the brightness of the objects in the group set and the brightness output from the indicator 12.

In the same manner as mentioned above, the determined object is subjected to a check processing that inverts the current brightness at step 164. For example, when the object is determined to be the object $OB_1$, the brightness of the object $OB_1$ is "dark." Thus as shown by one dot chain line in FIG. 14 (1), an indication is given to the object controller 68 so that the brightness successively turns "bright" "dark" and "bright." In the same manner, when the object is the object $OB_2$, the brightness of the object $OB_2$ is "bright." Thus as shown by the dotted lines in FIG. 14 (2), an indication is given to the object controller 68 so that the brightness is successively inverted to "dark," "bright" and "dark." Later the brightness of the objects $OB_1$ or $OB_2$ is detected so that an affirmative determination is made at step 132 when the brightness corresponds to the above checking processing. A value expressing that the object indicated by the operator is the object $OB_1$ or $OB_2$ is then output to the corresponding object processing part 66 thereby terminating the routine.

In addition, in the above description, three object determination processing was explained. Next, N objects processing will be explained by referring to FIG. 18. Furthermore, parts identical to the above determination processing (FIG. 12) are not explained. Only different parts thereof will be explained hereinbelow.

At step 172, a variable N is replaced with the total number of the objects, a variable n1 with 1 and a variable n2 with the value of the variable N as its initial value. the variable N is the number of objects as a candidate that should be determined to be selected objects. The initial value is the total number of display objects. The candidate is narrowed down in the above mentioned process. When it is narrowed down to one candidate, the value for this variable N assumes 1. In addition, the variable n1 shows the initial value of the object in the range that should be displayed. The variable n2 shows the value of the object.

At the subsequent step 173, a determination is made as to whether the value of the variable 1 is set to the value of the variable N. When the value is 1, the object has been narrowed down to one object: As a result of the inspection. Steps 166, 132, 133 and 134 are effected in the same manner as mentioned above (FIG. 12).

When a negative determination is made at step 173, the determination of a plurality of objects is required. Thus at step 174, processing is effected to divide the objects that remain as candidates equally into each group G1 and G2. In other words, a value k being half of the number of N of objects as a candidate that should be determined (when N is an even number, an equation k=N/2 is established whereas N is an odd number k=(N +1)/2 is determined), thereby equally dividing the objects into groups G1 and G2.

The group G1 sets the object $OB_n$ (n: n1 through n1+k−1) whereas the group G2 sets the object $OB_n$ (n: n1+k through n2).

At the subsequent step 176, a signal is output to the object controller 68 so that the group G1 of the object is turned "dark" whereas the group G2 is turned "bright." After that the brightness of the optical sensor is inspected (step 177) with the result that the process proceeds to step 178 when it is dark whereas the process proceeds to step 180 when it is bright.

At step 178, to set to group G1 the group of the objects to be inspected next the last object value (n1+k−1) in group G1 is set to the variable n2 exhibiting the last value in the range to be determined. On the other hand, at step 180, to set the group of object to be inspected, the initial object value (n1+k) in group G2 is set to the variable n1 expressing the initial value in the scope to be determined. At the subsequent step 182, the total number N of objects included in the set group is calculated (N=n2−n1+1) followed by returning to step 173. In this manner, the object indicated by the operator finally remains. The object can thus be easily determined.

Thus in the second embodiment, a plurality of objects thus determined are successively classified into two large groups to determine an object having a brightness identical to the brightness set at the last stage. When there are a large number of objects, the processing time can by such a method be made shorter than determining the brightness on an object-by-object basis.

A third embodiment is detailed hereinbelow. In the above embodiment, an indication for such operation as conversion of screens is output by the operator from an indicator 12 via a connection cable 30. The third embodiment of the apparatus determines the object at the PC 18 from a signal transmitted by radio. Moreover, the third embodiment of the apparatus has the same basic structure as in the second embodiment. Like parts are given like symbols and detailed explanation is omitted here. An explanation will be given only to different parts.

Figure 15:
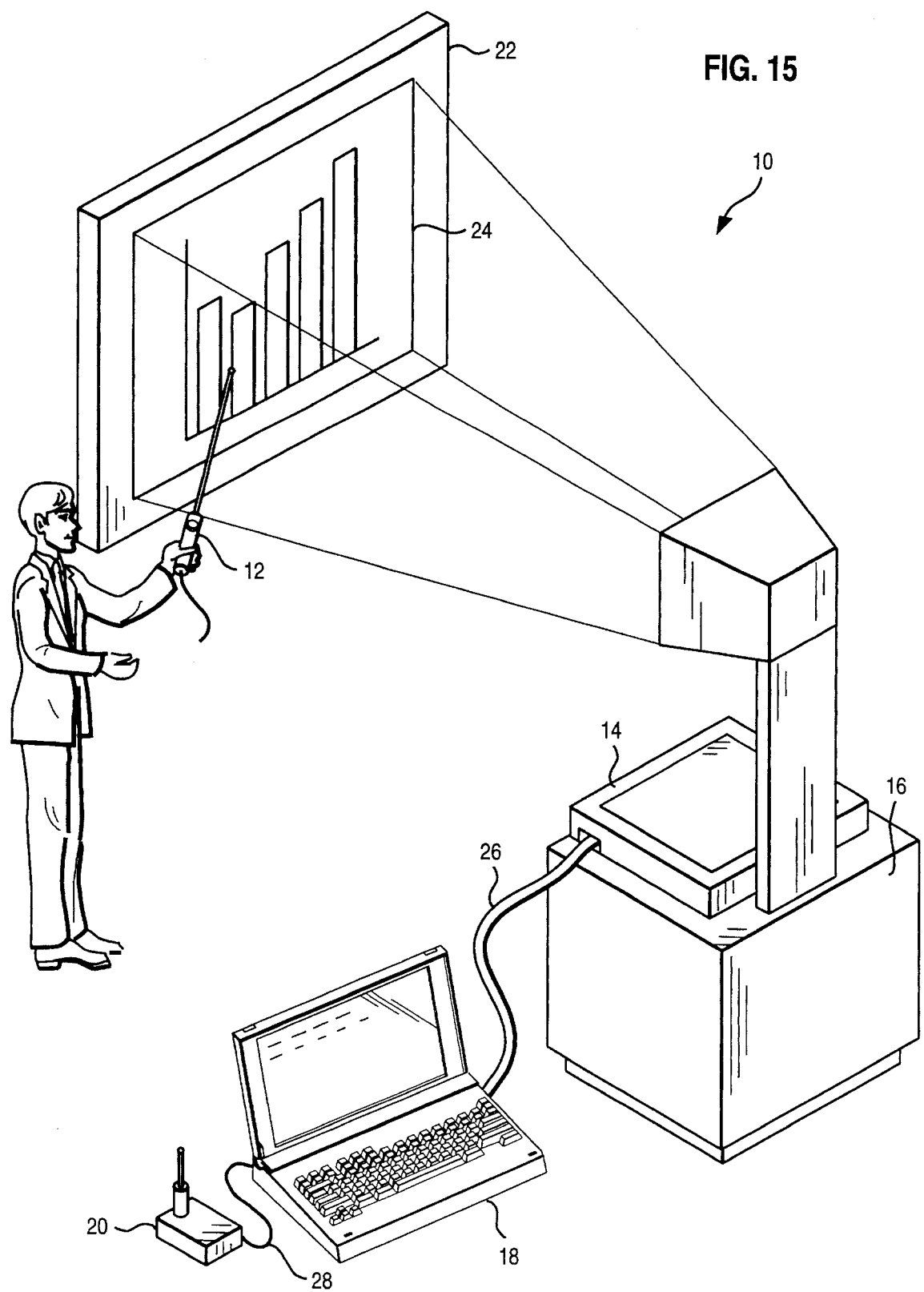
FIG. 15 is a external view showing the construction of an indicator in embodient 1 of the image displaying apparatus of the present invention.

As shown in FIG. 15, a receiver 20 is connected via a cable 28 to embodiment 3 of the image displaying apparatus 10. In addition, the indicator 12 is equipped with a transmitting circuit (see FIG. 16) 42 by encoding light received by the optical sensor 32 and an on-off signal to output it from an antenna 40.

Figure 16:
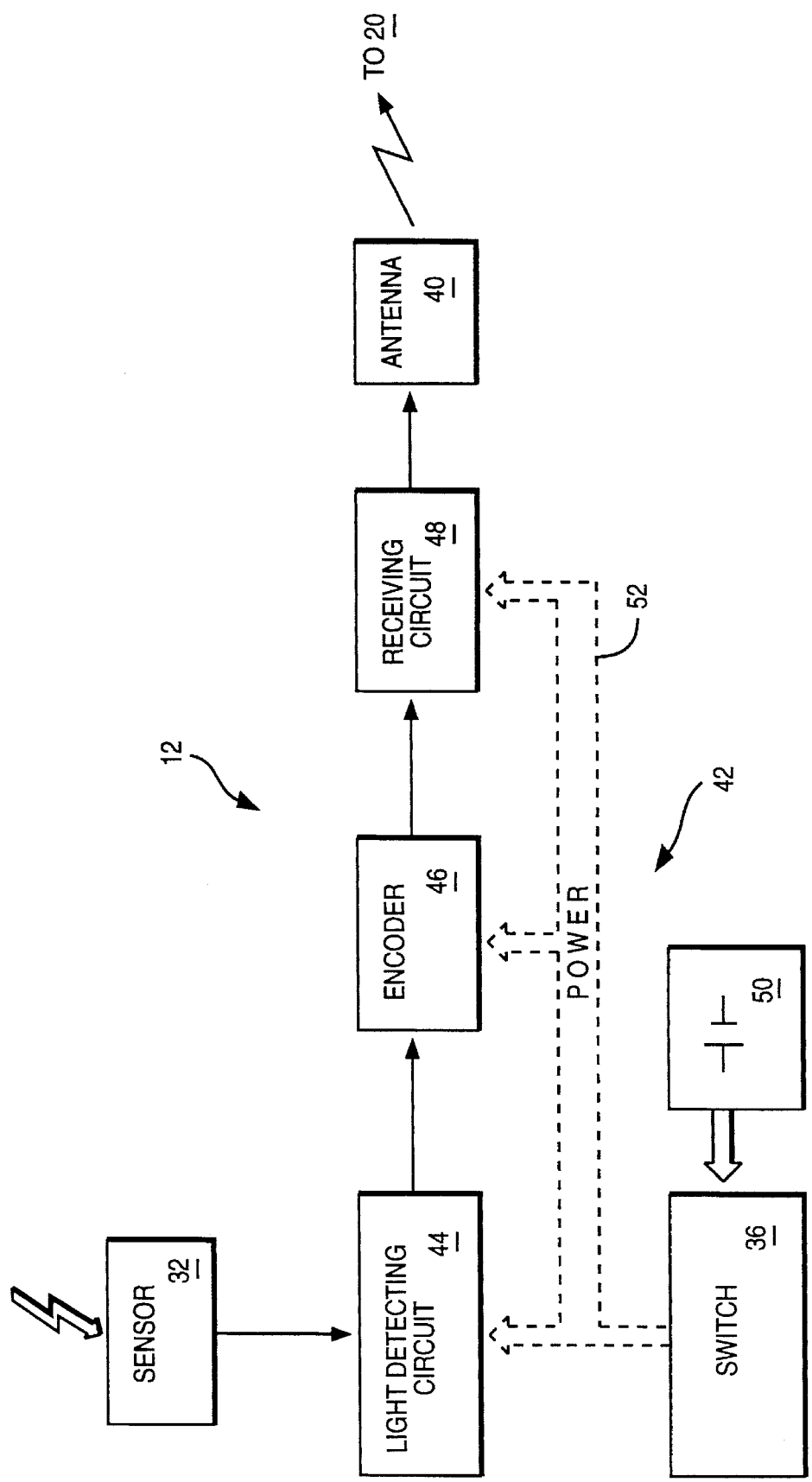
FIG. 16 is block view showing the general construction of an indicator in embodiment 3 of the image displaying apparatus.

As shown in FIG. 16, the sending circuit 42 of the indicator 12 comprises a light detecting circuit 44, an encoder 46, transmitting circuit 48, and a battery 50 such as a dry cell. The output side of the light detecting circuit 44 is connected to the transmitting circuit 48 via the encoder 46. The encoder 46 is a circuit for converting an entered signal into a bit queue to output it. A converted bit queue signal is output to the transmitting circuit 48. Furthermore, the encoder 46 stores in advance an ID code peculiar to the image displaying apparatus in addition to a signal output by the light detecting circuit 44. From the encoder 46 a bit queue signal is output for transmission added to a bit value of the output signal of the light detecting circuit 44. The receiving circuit 48 is connected to an antenna 40. The bit queue signal entered at the transmitting circuit 48 is converted into a signal for transmission, and the converted signal is transmitted from the antenna 40.

To the above light detecting circuit 44, the encoder 46, and the receiving circuit 48 electric power is supplied from the electric power line 52. In other words, the electric power line 52 is connected to the battery 50 via an indication switch 36. When the indication switch 36 is pressed, the electric power of the battery 50 is supplied to the light detecting circuit 44, the encoder 46, and the receiving circuit 48 via the electric power line 52.

Figure 17:
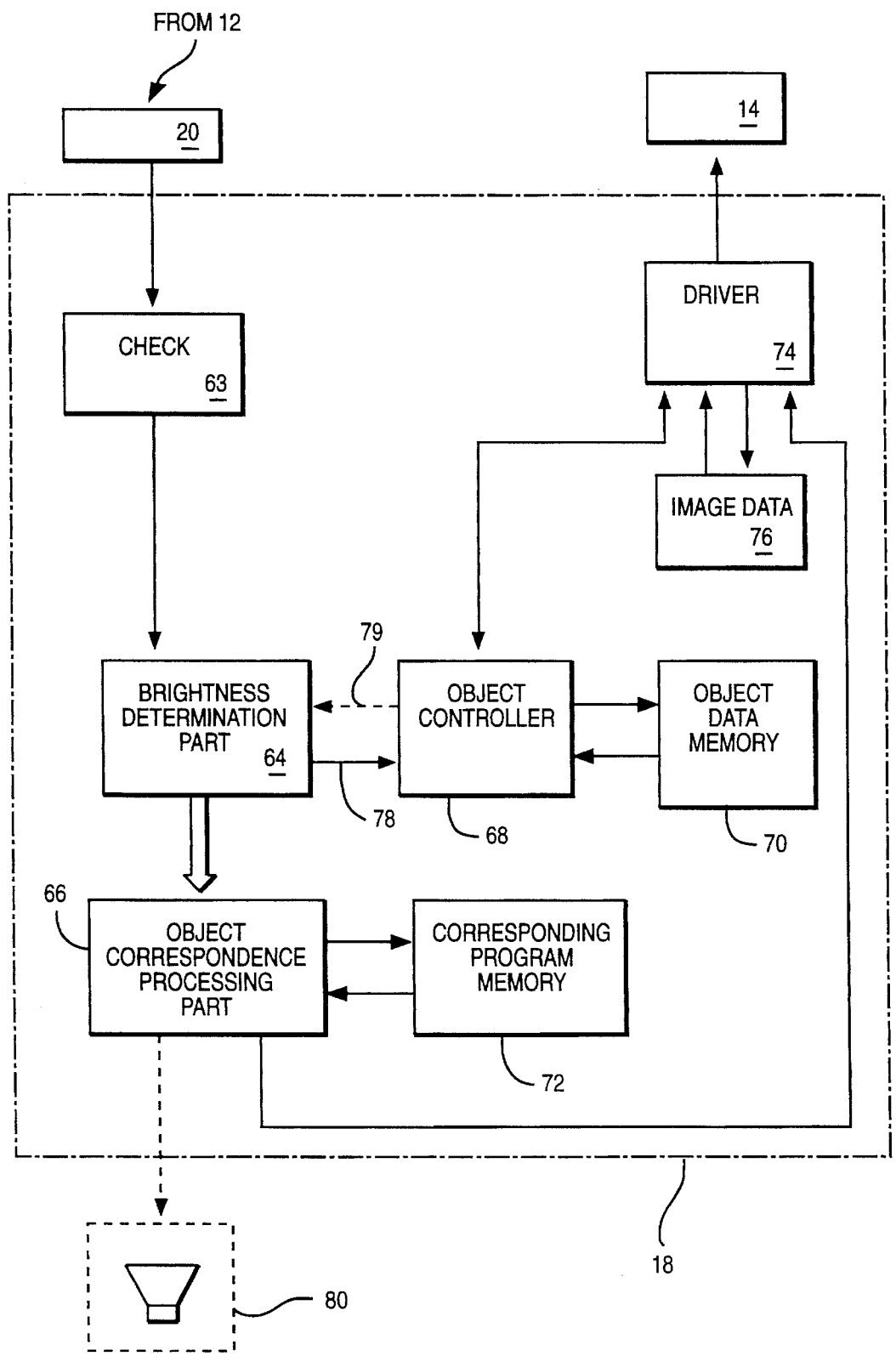
FIG. 17 is a block view showing the general construction of a personal computer used in embodient 3 of the image displaying apparatus.

FIG. 17 is a block view the PC 18 showing embodiment 3 by functions. In the third embodiment a checking part 63 is used in place of the switch determination part 62. The checking part 63 is connected so that a signal is entered from the receiver 20 to the checking part 63. Consequently, at the time of converting the display 24 projected on the screen 22, the operator presses the indication switch 36 to send from the indicator 12 a signal containing the brightness of the object by radio waves. The receiver 20 receives the signal sent from the indicator 12. The signal received at the receiver 20 is entered into the checking part 63 and is converted into a digital signal. When the apparatus determines that a signal is accurately transmitted from the indicator 12, a determination signal is output to the brightness determination part 64.

Operation of the third embodiment of the image displaying apparatus will be explained hereinbelow. The step 106 of the main control routine shown in FIG. 8 is effected in place of determining whether or not the check bit is appropriate with respect to the transmission signal from the indicator 12. Consequently, a plurality of objects (object image 94) is displayed (step 102). A determination is then made as to whether the check bit is appropriate or not with respect to the transmission signal from the indicator 12 (step 104, 106). In the case of an appropriate check bit, the process proceeds to step 108. Since step 108 and 114 are the same as the above the first embodiment, detailed explanation is omitted here. Moreover, with respect to the interruption routine shown in FIG. 11, an interruption can be made when the check bit becomes inappropriate.

In this way, in the third embodiment, the indicator 12, and the PC 18 transmit to each other by radio. Thus the travel scope of the operator can be expanded. Furthermore, in embodiment 3, the start of the inversion of the object brightness ("bright" and "dark") is determined by using the check bit included in the signal to be transmitted. Thus operational errors at the time of receiving and sending a signal by radio decrease. The processing corresponding to the indication by the operator can be accurately effected.

Moreover, the third embodiment of the apparatus detects the depression of the indication switch 36 by the operator and removes the noise of other radio waves. Such depression may be detected and noise may be removed by mounting a detection circuit such as a squelch circuit.

Incidentally, in the above embodiment, explanation is made on an example in which an image is displayed on the screen with the OHP. The present invention is not limited to this. The present invention can be applied to an apparatus for displaying an image on a displaying apparatus such as video projectors, CRT's, and LCD's. Furthermore, the present invention is not limited to the conversion of static images.

Needless to say, the present invention can be applied to the quiescing, quick traverse, and rewinding of animation using digital images.

In addition, as a switch 36, different forms of switches such as push buttons, contactless switches which sense distance, and switches detecting a quantity of light can be used.

As described above, in an advantageous aspect the invention an indication means initiates the start of the detection of the brightness. The invention thus has an advantage in that an indicated indication region can be determined with certitude by easily synchronizing a timing such as the conversion of a display indicated by the operator and that the consumption of batteries contained in the case of containing batteries in the indication means because the indication means is actuated with the switch.

In another advantageous aspect the invention a plurality of indication regions are classified into two groups. Thus the present invention has an advantage that no increase in the processing time is effected, a plurality of indication regions are determined in the order so that the operator can swiftly and accurately detect an indication such as the conversion of a display indicated by the operator.

We claim:

1. An image display apparatus, comprising:

means for generating a video image with multiple regions;

means for varying the intensity of a selected region of the video image, created by the means for generating, about an intensity level for the selected region;

means for detecting by optical sensor the intensity of the selected region of the video image;

means for comparing the detected intensity of the selected region with an average of the detected intensity, the average corresponding to the level for the selected region, to derive variations in the intensity created by the means for varying;

means for identifying the selected region using the derived variations; and means for changing the generated video image responsive to the identification of the selected region.

2. The apparatus recited in claim 1, wherein the means for detecting is positionable to the selected region by a user.

3. The apparatus recited in claim 2, wherein the means for varying is directly responsive to user enablement.

4. The apparatus recited in claim 3, wherein the means for varying changes the intensity of the different regions in different rates.

5. The apparatus recited in claim 4, wherein the means for detecting comprises a user handled light sensor.

6. A method for controlling the display of an image, comprising the steps of:

generating a video image with multiple regions;

varying the intensity of a selected region of the video image about a level for the selected region;

selecting a region of the video image;

detecting by optical sensor the intensity of the selected region of the video image;

comparing the detected intensity of the selected region with an average of the detected intensity, the average corresponding to the level for the selected region, to derive the created variations in the intensity;

identifying the selected region using the derived variations; and changing the generated video image responsive to the identification of the selected region.

7. The method recited in claim 6, wherein the step of detecting comprises a selection of a region of the video image by user positioning.

8. The method recited in claim 7, wherein the step of varying is directly responsive to user enablement.

9. The method recited in claim 8, wherein the step of varying changes the intensity of the different regions in different rates.

10. The method recited in claim 9, wherein the step of detecting involves a user location of a light sensor.

* * * * *